United States Patent [19]

Cook

[11] Patent Number: 4,603,965

[45] Date of Patent: Aug. 5, 1986

[54] APPARATUS AND METHOD FOR MAKING COLOR PHOTOGRAPHIC PRINTS

[76] Inventor: Kenneth O. Cook, 426 Palma Dr., Salinas, Calif. 93901

[21] Appl. No.: 750,379

[22] Filed: Jun. 28, 1985

[51] Int. Cl.$^4$ ................... G03B 27/80; G03B 27/62
[52] U.S. Cl. ................................. 355/38; 355/75
[58] Field of Search .................. 355/37, 38, 75, 76

[56] References Cited

U.S. PATENT DOCUMENTS

| | | | |
|---|---|---|---|
| 3,672,768 | 6/1972 | Schaub et al. | 355/38 |
| 3,813,158 | 5/1974 | Zahn et al. | 355/38 |
| 3,873,199 | 3/1975 | Weinert | 355/38 |
| 3,873,200 | 3/1975 | Crete et al. | 355/38 |
| 3,887,279 | 6/1975 | Rubin | 355/38 |
| 3,924,121 | 12/1975 | Barbieri | 355/38 X |
| 4,241,993 | 12/1980 | Guillaume | 355/75 |
| 4,492,457 | 1/1985 | Kawada et al. | 355/38 |

*Primary Examiner*—Richard A. Wintercorn
*Attorney, Agent, or Firm*—Townsend & Townsend

[57] ABSTRACT

A color printing apparatus and method in which a light chamber receives light from a light source after the light has passed through a negative supported by a negative carrier. The light chamber has a number of electronic sensors which sense the light in the chamber and control filters across the path of the light before the light strikes a color paper strip for printing the image of a negative onto the strip itself. In one embodiment of the invention, a negative carrier has a number of slots adjacent to the opening in the carrier across which the negative is to be placed in the path of the light beam. These slots provide passages for additional light from the light source into the light chamber whereby the light passing through the negative and the additional light is mixed together to dilute the total light in the chamber to normalize the readings of the sensors before the sensors are used to actuate filters across the path of the light beam. In another embodiment, light from a light source can be directed into the light chamber along a path defined by a light passage, such as a fiber optics bundle. In a third embodiment, the invention can include a light source in the light chamber itself with the light source being actuated when light passes through the negative for exposing the image on a color paper strip.

28 Claims, 6 Drawing Figures

U.S. Patent  Aug. 5, 1986  4,603,965
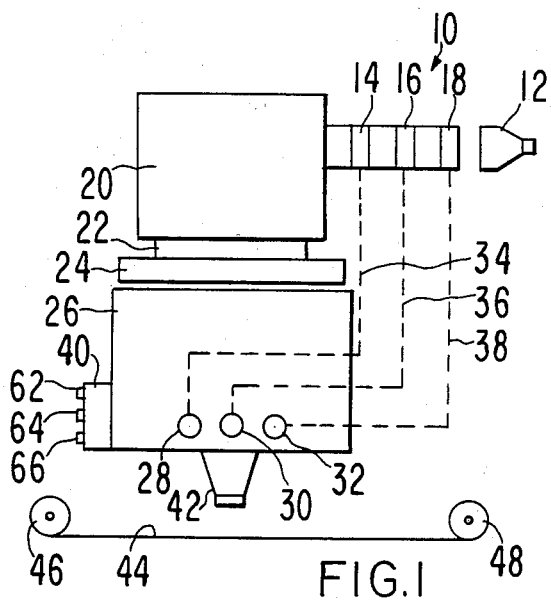
FIG. 1
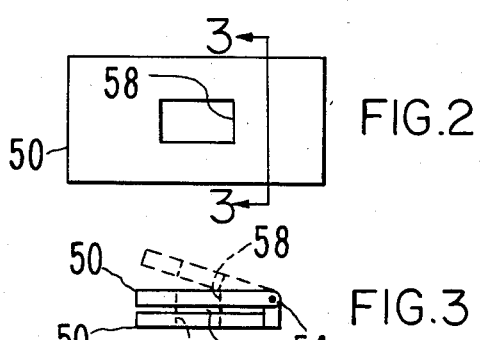
FIG. 2
FIG. 3
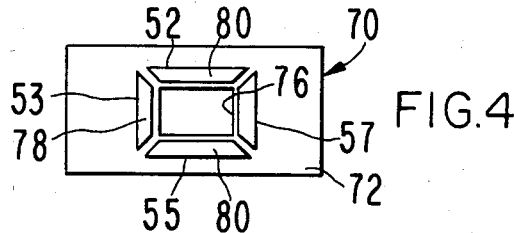
FIG. 4
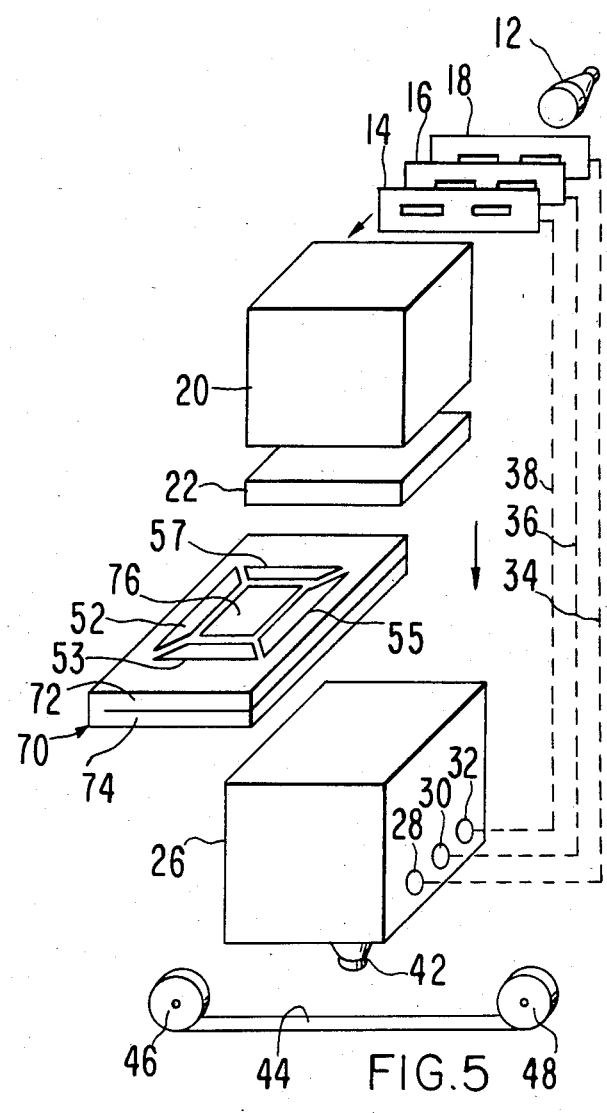
FIG. 5
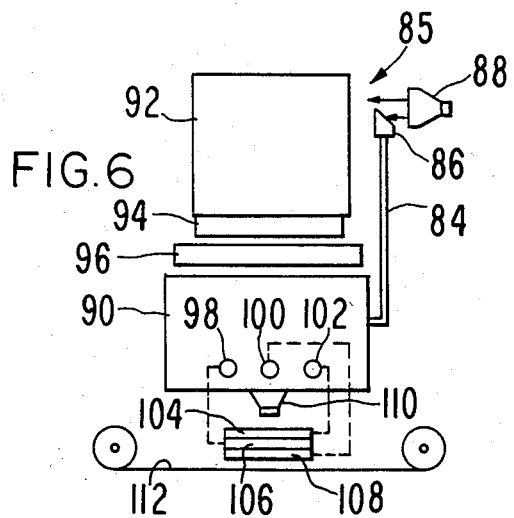
FIG. 6

APPARATUS AND METHOD FOR MAKING COLOR PHOTOGRAPHIC PRINTS

This invention relates to improvements in color photographic printers and, more particularly, to an improved printer and method of using the same to provide for higher quality color photographs.

BACKGROUND OF THE INVENTION

In the more than 40 years since automatic color photograph printers were developed, all technology has focused on the area of a given color negative as it is masked in an opaque negative carrier. As light passes through the negative in a conventional color printer, it is diffused and scattered in a chamber where red, blue and green sensors electronically read the light passing through the images of the red, blue and green layers of the film. Electronic signals activate cyan, yellow and magenta color filters of the printer simultaneously so that such filters are moved into the path of the light from a light source of the printer before the light strikes the color paper on which color positive prints are to be made. This technique is called subtractive color printing. In another method, called additive color printing, the above sequence is the same except that several electronic circuits actuate one at a time, each making a second separate exposure through the red, green and blue color filters.

Under present technology, a standard or master negative film is used as a reference against which the colors and density of an automatic printer are set and the image to be developed on the paper is compared. The standard or master negative film must be analyzed, printed and processed through color light chemistry repeatedly until, by trial and error, a good color balance is achieved. Since each trial and error step involves the printing of a photograph, such a process consumes time and materials and is relatively expensive to practice. Moreover, the degree of excellence of the color balance under present technology is contingent upon the skills of the operator of the printer to eliminate the effects of variables which occur among color negatives and color papers.

Under present technology, most photograph negatives fall into an average range which the sensor electronics of an automatic printer can adequately handle by reference to the standard or master negative. The average range is basically a color and light balance setting which is a compromise between extremes of darkness, brightness and multiple basic colors. This compromise, since it is within a mean range, will produce many acceptable prints from color negatives. The range of acceptable negatives depends upon the quality of the operator's skills and time which he devotes to balancing the colors on a given print.

When defective photographs occur under present technology, it is generally for one or two reasons. The first and most common reason is density failure. When this occurs, the color prints are too dark or too light which results in loss of detail in the resulting image on the print.

The second common area of failure is subject failure. When this occurs, the print is too red, too blue, too green, too cyan, too magenta or too yellow. For example, blue tinted skin tones in a resulting photographic print are the result of subject failure.

Density failure occurs when the negative to be printed has excessive light or dark areas in relation to the colors of the standard negative. Subject failure occurs when the negative to be printed has an excessive area of one color in relation to the standard negative.

Because of the foregoing drawbacks in connection with conventional printers, a need exists for improvements in the making of color photographic prints so as to reduce and substantially eliminate problems due to density failure and subject failure as described above. The present invention satisfies this need as hereinafter described.

SUMMARY OF THE INVENTION

The present invention satisfies the aforesaid need by providing an improved color printing apparatus, a color printing method, and a modified negative carrier for such an apparatus wherein the light receiving chamber containing the sensors of the apparatus will be provided with additional filtered light over and above the light passing through the negative whose image is to be printed when the negative is mounted in the holder. This additional light is used to dilute the light passing through the negative in the holder so as to make every negative processed with the apparatus more nearly normal and more nearly equal in color content and balance as a master negative used in conditioning the apparatus at the beginning of a series of printing operations with a number of different negatives.

The improved negative carrier of the present invention includes a mask having a central opening for receiving a negative to be printed. The mask has slots near the outer periphery of the central opening for admitting additional light to the mixing chamber containing the sensors of the apparatus, and the light from the light source not only passes through the negative and into the light chamber but also passes through the slots and into the light chamber. The total area defined by the slots is preferably in the range of 50–200% of the area of the opening provided for the negative itself, such area being more nearly 90–110%, and preferably is 100% of the area of said central opening.

In another form of the invention, a color printer can be provided with a light delivery unit, such as a fiber optics bundle, leading to the mixing chamber from the light source of the printer or from a separate light source. Thus, instead of having additional light passing through the holder itself, the additional light can bypass the holder and enter the light chamber directly from the light source externally or internally of the printer. Thus, the prints that are made with the additional light present the image of the negative which is balanced in light and color because of the dilution of the total light in the mixing chamber so that excessively light and dark areas of a negative are diminished on the the color print.

When using the improved negative carrier with the slots therein, the light that passes through the slots after being mixed and analyzed, passes through the lens and projects beyond the edges of the mask which holds the color paper in place. Only the light that passes through the negative enters the lens and projects onto the unexposed color paper. In this way, the added light has no effect on the exposure of the color paper.

The primary object of the present invention is to provide an improved color printing apparatus and method for making color prints wherein additional filtered light is directed into the mixing chamber containing the sensors of the apparatus so that such additional filtered light can be used to dilute the light reaching the sensors through the negative to be printed, resulting in changes in color filters associated with the sensors such that the image of the print more nearly approaches the ideal qualities of a print made from a standard or master negative which is used to pre-condition the apparatus before a number of negatives are handled with the apparatus.

Another object of the present invention is to provide an improved negative carrier for apparatus of the type described wherein the carrier is provided with openings therein adjacent to the central opening, across which a negative is to be placed so that added filter light can pass through the openings to dilute the light in the mixing chamber containing the sensors adjacent to the holder to thereby provide a normalizing effect on the response of the sensors to the light and provide truer images on the color paper printed from the negatives themselves.

Other objects of this invention will become apparent as the following specification progresses, reference being had to the accompanying drawings for an illustration of the invention.

IN THE DRAWINGS:

FIG. 1 is a schematic side elevational view of one type of color printing apparatus with which the present invention is suitable for use;

FIG. 2 is a top plan view of a prior art film holder used with the printing apparatus of FIG. 1;

FIG. 3 is a cross-sectional view taken along line 3—3 of FIG. 2, showing a negative film in position to be printed with the apparatus of FIG. 1;

FIG. 4 is a view similar to FIG. 2 but showing an improved film holder of the present invention;

FIG. 5 is an exploded view of the apparatus of FIG. 1; and

FIG. 6 is a view similar to FIG. 1 but showing another type of color printing apparatus and illustrating a further improvement of the present invention for making high quality color photographs.

To illustrate the teachings of the present invention, a conventional color printing apparatus 10 is used. Apparatus 10, as shown in FIG. 1, includes a light source 12 on one side of three horizontally aligned filters 14, 16 and 18. Filter 14 is a magenta filter, filter 16 is a yellow filter and filter 18 is a cyan filter. The filters are aligned with a side opening in a light mixer or diffusion chamber 20 having an opening in the bottom thereof for allowing light to pass through a diffusion glass 22 which is mounted above a film carrier 24 removably mounted in machine 10 and adapted to contain a negative to be printed.

Carrier 24 is above a light chamber 26 in which three different sensors 28, 30 and 32 are located. These sensors sense light of particular colors, namely, sensor 28 senses green light, sensor 30 senses blue light and sensor 32 senses red light. The sensors are electronically coupled by lines 34, 36 and 38, respectively, to respective filters 14, 16 and 18 for adjusting the positions of such filters by solenoid action across the path of light from light source 12.

When the light entering chamber 26 strikes the sensors, they react to provide signals which are sent to the solenoids associated with the filters to provide an adjustment of the color filters so as to balance the light in a particular manner. Such color balance is set by controls of a control panel 40 on the front of apparatus 10 in some suitable location. For instance, if the controls are set for respective relative values for the three sensors 28, 30 and 32 as determined by the skill of the operator of apparatus 10, the sensors will react to the incoming light into chamber 26 correspondingly so that the filters 14, 16 and 18 will be shifted into or out of the path of the light from light source 12 to assure that the light will be balanced as it passes through the film in film carrier 24.

Light coming out of the light chamber 26 will pass through a lens 42 and onto a color paper strip 44 wound on a supply reel 46 and on a take-up reel 48. The paper strip is exposed by light passing through film 56 in carrier 24 and discrete segments of the paper will be provided with exposed images thereon which can later be developed and then cut into individual photographs.

Since the machine must be periodically adjusted to handle the different factors affecting the color of the resulting print, a standard negative is typically used in carrier 24. This negative is placed in the holder and adjustments are made to the three controls 62 (yellow), 64 (red) and 66 (blue) on control panel 40 (FIG. 1) by trial and error. The operator of apparatus 10 can determine by experience what is the best setting for the controls for the specific standard negative used with carrier 24. This may require a number of different prints to be made and then compared so that much depends upon the degree of skill possessed by the operator. This is a time consuming operation and one which is simplified and reduced in complexity by the use of the present invention as hereinafter described.

The present invention is directed to the improvement of adding additional, at least partially filtered light to the light chamber 26 so that such additional, at least partially filtered ight will have a dilution effect on the light entering the chamber through a negative 56 carried by a negative holder. To achieve this end, an improved carrier broadly denoted by the numeral 70 is shown in FIGS. 4 and 5. Holder 70 includes a pair of panels 72 and 74 which are hingedly interconnected in the manner shown in FIG. 3 so that they can be separated to allow insertion of a color negative 56 therebetween. Panels 72 and 74 have openings 76 which are aligned with each other and across which a negative is to be placed. In addition to openings 76, panels 72 and 74 both have slots 52, 53 55 and 57 at the outer boundaries of the openings 76 as shown in FIG. 4. These slots are adjacent to the sides and ends of respective openings 76 and, since the openings 76 are generally rectangular, the slots are elongated and generally parallel to the adjacent sides and ends along which they extend.

The area of these slots is important. Preferably, the total area of the slots of each of panels 72 and 74 should be in the range of 50-200% of the area of the respective openings 76. More nearly, the area should be 90-110% and preferably 100% of the area of the respective openings 76. For purposes of illustration, the slots are dovetailed with respect to each other; however, they could be square at the ends, if desired. The slots of panel 72 are aligned with respective slots of panel 74 so that the pairs of aligned slots effectively form single passages for light passing through the holder 70 from light source 12.

Preferably, at least three of the four slots of each of panel 72 and 74 are provided with color printing filters compatible with the standard or master negative. For example, slot 53 will be provided with a magenta filter while slots 52 and 55 will be provided with yellow filters 80. Slot 57 opposite the slot 53 will have no filter and will be clear although it could have a filter, if desired. The color filters shown on FIG. 4 with respect to panel 72 will be same filters as provided in respective slots of panel 74.

The light which passes through the slots 52, 53, 55 and 57 mixes in chamber 26 with the light which has passed through negative 56. The light passing through the slots thereby dilutes the light passing through the negative and thereby makes a more normal negative out of every negative that is plaed in the holder for color printing purposes. Thus, in contrast to the problems raised by density failure and subject failure using a conventional negative film carrier 24, the present invention substantially minimizes or eliminates the effects of density failure and subject failure because of the dilution achieved by the addition of light to chamber 26 through the slots of holder 70. The total light mixture which strikes the sensors 28, 30 and 32 will cause an automatic adjustment of filters 14, 16 and 18 and will have an averaging or balancing effect on the incoming light to light box 20 so that the light will be correctly balanced for the negative which is held in carrier 70.

While carrier 70 provided with slots 52, 53, 55 and 57 illustrates the way in which additional light can be added to chamber 26, it is also possible to use a fiber optics bundle 84 in a color printing apparatus 85, bundle 84 having an inlet end 86 aligned with light source 88 so that light will enter light chamber 90 (corresponding to light chamber 26 of apparatus 10) so as to be mixed with the light passing downwardly from light mixing container 92 after the light passes through a diffusion glass 94 and a holder 96 which may be of conventional construction, such as of the same construction as holder 24 (FIGS. 2 and 3). Sensors 98, 100 and 102 in chamber 90 are coupled by leads to respective filters 104, 106 and 108 below the lens 110 and above color paper 112. Apparatus 85 is of the type made and sold by the Yokohama Company of Tokyo, Japan; whereas, apparatus 10 is of the type of machine made and sold by Durst Limited of the United Kingdom.

In the use of apparatus 10 with carrier 70, a standard or master negative film is placed in the holder and the holder is inserted in apparatus 10. Then, with the adjusted controls 62, 64 and 66 at desired positions, a color print is made to check the balance of the resulting colors on the resulting print. Typically, only a single test run need be made because the dilution effect of the added light passing through the slots of holder 70 will immediately condition apparatus 10 for making color prints from a plurality of different negatives even if the negatives have overriding light areas, dark areas or strong colors. The added light mixing with the light through the negative causes sensors 28, 30 and 32 to send more normal reference signals to filters 14, 16 and 18 so that they more nearly correspond with the readings or signals achieved with the standard negative. Thus, the prints that are made from the use of negatives of different densities will contain a truer image balanced in light and color and thereby avoiding the density failure and subject failure which occurs with the use of conventional carriers 24.

Apparatus 85 is conditioned with a standard or master negative in the same manner as apparatus 10 as described above. In either case, the added light to the chamber containing the sensors has the effect of diluting the total light reaching the sensors so that every negative processed with the practice of the present invention causes the negative to be more nearly like the standard negative without the mny trial and error tests which must be run as required with the use of conventional holders.

The present invention operates to introduce partially filtered light that is evenly balanced when read by the red, green and blue sensors. This partially filtered light is mixed with the light coming through a negative, and this mixture of light is read by the red, green and blue sensors. When the mixture of light is programmed into the color balance controls of the printing apparatus, the production that follows is less sensitive to density and subject failure.

The readings produced from this mixture of light are balanced against a master negative and programmed into the color balance controls of the printing apparatus. The production that follows is of a higher quality and less subject to the density and subject failure.

I claim:

1. A color printing apparatus comprising:
   a light chamber having a number of light sensors therein, each sensor being responsive to light of a particular color;
   a light source;
   means for directing a light beam along a path from the light source toward the light chamber;
   a negative carrier across the light beam for holding a negative to be printed;
   a lens coupled with the light chamber for directing light out of the same;
   a color paper strip aligned with the lens for receiving light therefrom for exposure of the color paper strip to form the image of a negative held by the carrier;
   a number of actuatable color filters between the light source and the color paper strip, said filters being coupled to respective sensors for actuation thereby; and
   means coupled with the light chamber for providing additional, at least partially filtered light thereto for mixture with the light passing through the negative, whereby the sensors will respond to the total light in the light chamber in a manner to cause respective filters to be actuated such that the resulting color print will more nearly approach the color density and balance achieved with a color print made from a master negative.

2. Apparatus as set forth in claim 1, wherein said holder has means defining a light delivery opening therethrough for passing said additional light to the light chamber.

3. Apparatus as set forth in claim 2, wherein said carrier has a negative-receiving central opening, and wherein the light-delivery opening is adjacent to the negative-receiving aperture of the holder.

4. Apparatus as set forth in claim 1, wherein said carrier has a negative-receiving central opening, and wherein the carrier has a number of slots therethrough near the outer periphery of the central opening, said slots being defined by respective portions of holders, said portions defining said directing means.

5. Apparatus as set forth in claim 4, wherein is included a light filter across at least one of the slots.

6. Apparatus as set forth in claim 5, wherein is included a filter for at least three of the slots.

7. Apparatus as set forth in claim 6, wherein one of the filters is a magenta filter and the other filters are yellow filters.

8. Apparatus as set forth in claim 1, wherein said providing means includes means for directing light into the light chamber independently of the carrier.

9. Apparatus as set forth in claim 8, wherein said directing means includes a light pipe and a light source.

10. Apparatus as set forth in claim 9, wherein the light pipe is externally of the carrier and the light chamber.

11. Apparatus as set forth in claim 10, wherein said directing means includes a light diffusion chamber, the light pipe being interiorly of the light chamber and the diffusion chamber.

12. A method for making a color print from a color negative comprising:
   placing the negative across the path of a light beam;
   directing the light passing through the negative into a light-receiving chamber;
   providing additional, at least partially filtered light to the chamber to form a mixture of light;
   sensing the color content of the mixed light;
   adjusting the color of the light of said light beam before the light beam passes to a second zone and as a function of the sensing step; and
   printing the image of the negative at the second zone on color print paper.

13. A method as set forth in claim 12, wherein said step of providing additional light includes passing a portion of the light directed toward the negative into and through an opening adjacent to the negative and into the chamber.

14. A method as set forth in claim 12, wherein said step of providing additional light to the chamber includes directing the portion of the light of said lightbeam through slots adjacent to and surrounding the negative.

15. A method as set forth in claim 14, wherein is included the step of filtering the light as it passes through at least one of the slots.

16. A method as set forth in claim 12, wherein the step of providing additional light includes passing the light along a path separate from the path along which said light passes into the chamber.

17. A method as set forth in claim 12, wherein the step of providing additional light includes directing light into the chamber along a path different from the path of said light beam:

18. A method as set forth in claim 17, wherein said different path is formed by a fiber optics bundle.

19. A method as set forth in claim 17, wherein said chamber has a light source in it, said step of providing additional light including actuating said light source.

20. In a color printing apparatus having a light source and a light chamber for receiving a light beam from the light source, a negative carrier for supporting a photographic negative in the printer across the light beam between the light source and the light chamber comprising:
   a pair of hingedly interconnected panels, each panel having a generally central opening, the central openings being aligned with each other, and the panels being adapted to support a photographic negative therebetween when the panels are adjacent to each other and when the negative is in alignment with the central openings; and
   means on each panel, respectively, for defining at least one other opening adjacent to the respective central opening, said other openings of the panels being aligned with each other when the panels are adjacent to each other for allowing light to pass through the carrier and into the light chamber in bypassing relationship to the central openings, whereby additional light will be directed into the light chamber.

21. In apparatus as st forth in claim 20, wherein said defining means includes a number of slots defining said other openings in the panels, said slots being adjacent to the outer peripheries of respective central openings.

22. In apparatus as set forth in claim 21, wherein is included filter means across certain of the slots.

23. In apparatus as set forth in claim 22, wherein one of the filters is a magenta filter and another filter is a yellow filter.

24. In apparatus as set forth in claim 20, wherein said defining means includes portions of the panels of the holder having slots therethrough with the slots of one panel being aligned with respective slots of the other panel.

25. In apparatus as set forth in claim 23, wherein the central openings are rectangular, the slots being elongated and dovetailed at the ends with respect to each other.

26. In apparatus as set forth in claim 24, wherein the area of the slots of each panel are in the range of 50–200% of the area of the respective central opening.

27. In apparatus as set forth in claim 24, wherein the area of the slots of each panel are in the range of 90–110% of the area of the respective central opening.

28. In apparatus as set forth in claim 24, wherein the area of the slots is 100% of the area of the respective central opening.

* * * * *